Dec. 24, 1968     H. J. L. SMITH     3,417,442
QUICK RELEASE FASTENERS
Filed Feb. 24, 1967
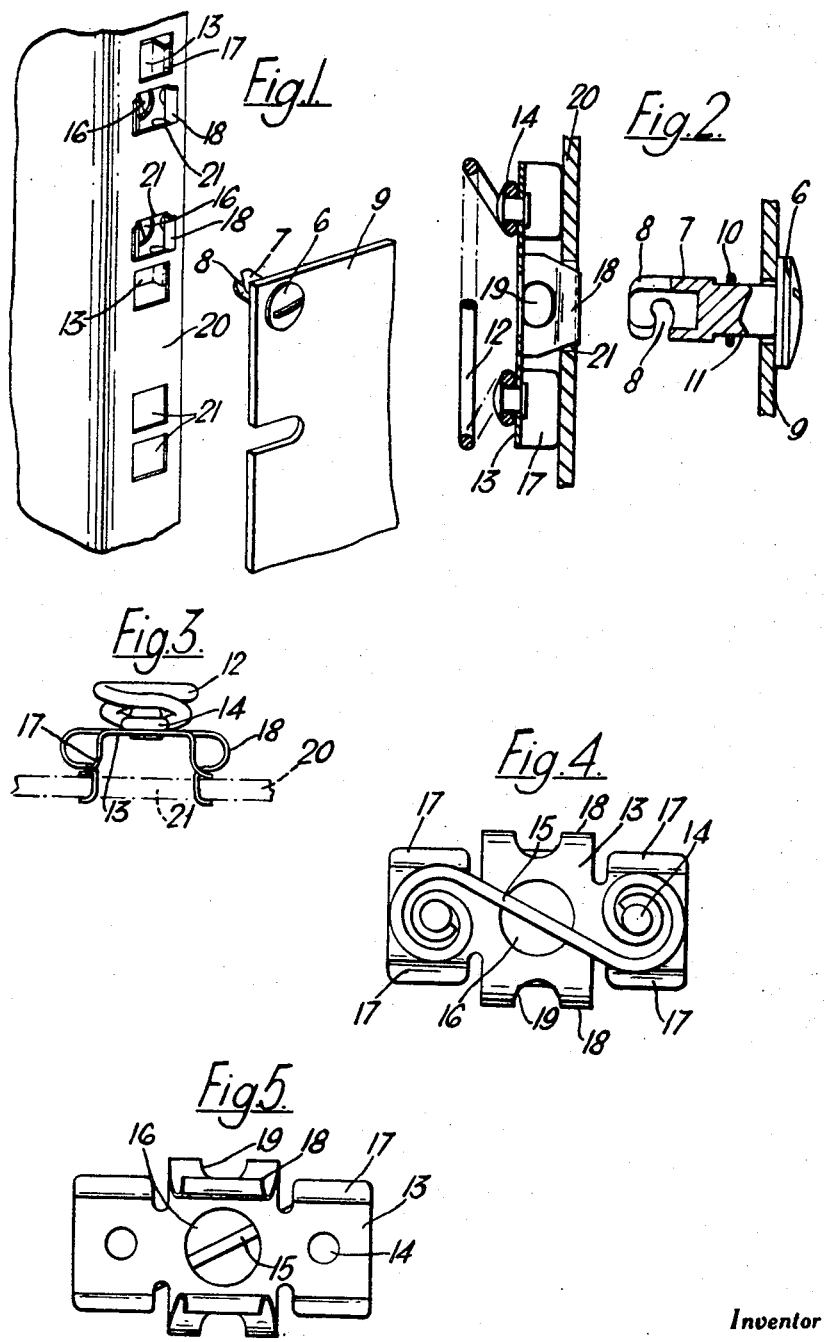
Inventor
HOWARD JOHN LEONARD SMITH
By DANIEL H. KANE
Attorney

United States Patent Office 3,417,442
Patented Dec. 24, 1968

3,417,442
QUICK RELEASE FASTENERS
Howard John Leonard Smith, Farnham, Surrey, England, assignor to Dzus Fastener Co. Inc., West Islip, N.Y., a corporation of New York
Filed Feb. 24, 1967, Ser. No. 618,465
3 Claims. (Cl. 24—221)

ABSTRACT OF THE DISCLOSURE

The invention concerns a quick release fastener of the Dzus type for holding two panels together. The fastener has a retaining member, such as a spring wire or cup, mounted on a base plate having bent edge portions which form both spacers and resilient legs, the legs being arranged to fit into a rectangular aperture in a panel to hold the retaining member assembly in position. A stud can then pass through the aperture, through a hole in the base plate and into engagement with the retaining member.

---

This invention relates to quick release fasteners which are used for holding together two panels face to face and which consist of two parts, a stud and a retaining member. In use the shank of the stud passes through aligned holes in the two panels and co-operates by relative rotation with the retaining member secured to the back of the second one of the panels. The retaining member may be a spring wire, as described for example in United States Patent No. 2,506,953 of May 9, 1950. The stud may be captive but rotatable in the opening in the first one of the panels. With a fastener of this kind the two panels can be secured together simply by rotating the stud through a part turn from the front of the first panel without the necessity of providing access to the retaining member at the back of the second panel.

It is conventional to secure the retaining member, or a base plate to which the retaining member is fitted, to the back of the second panel by riveting. This operation takes a considerable time and requires manipulation of the whole of the second panel relatively to the riveting machine. In addition it calls for accurate location of the three holes in the second panel, one for the shank of the stud to pass through and at least two others for the rivets by means of which the retaining member is secured to the second panel.

It is an object of the invention to provide a retaining member assembly for a quick release fastener of the kind described which can be readily fitted to a rectangular aperture in a panel such as a standard panel pierced with square apertures at "international fixings centres."

A further object is to provide a simple construction of retaining member mounted on a base plate and adapted to be removably fitted to a rectangular aperture in a panel without the necessity of performing any operation on the panel other than the piercing of the aperture.

These objects are accomplished by firmly attaching a retaining member to one surface of a base plate having a hole in it through which a stud can pass into engagement with the retaining member. Edge portions of the base plate are bent away from the other surface of the base plate to provide spacers adapted to engage a panel adjacent to a rectangular aperture in the panel, and a pair of legs are provided which are arranged to pass through the aperture and resiliently embrace opposite edges of the aperture to locate the assembly in position with the hole in the base plate in register with the aperture in the panel.

Other objects and advantages of the invention will be apparent from the following description to be read in conjunction with the accompanying drawings in which:

FIGURE 1 is a perspective view of a fastener incorporating the invention fitted to two panels which are about to be fastened together;

FIGURE 2 is a central vertical section through the fastener and part of the panels as shown in FIGURE 1;

FIGURE 3 is an end elevation of the retaining member assembly of the fastener;

FIGURE 4 is a rear face elevation of the retaining member assembly; and

FIGURE 5 is an elevation similar to FIGURE 4 but of the other face of the retaining member assembly.

The stud of the fastener has a head 6 formed with a screwdriver slot and a shank 7 formed at its free end with a helical cam slot 8. As shown in FIGURES 1 and 2 the stud may be held rotatably captive in an aperture in a first panel 9 by means of a resilient grommet 10 which is pushed over the shank 7 and snaps into a reduced diameter neck portion 11, thus trapping the part of the plate 9 around the aperture between the head 6 and grommet 10.

The retaining member consists of an S-shaped wire spring rod 12 the coiled ends of which are secured on a rectangular springy metal base plate 13 by means of two rivets 14, with a straight portion 15 of the wire spring 12 extending diametrically across and above a circular hole 16 in the base plate 13.

The base plate 13 is formed from an integral blank and has three pairs of edge portions along its two longer edges bent out of the plane of the base plate to the side opposite that on which the spring wire 12 is mounted. Four of these edge portions 17 form spacers and the other two form legs 18, one on each side of the hole 16 midway along the base plate. The legs 18, which project from the base plate 13 further than the spacers 17 consist of outwardly convex part cylindrical zones merging into an outwardly concave channel zone. The outwardly convex zone of each leg 18 is provided with an aperture 19 which increases the resilience of the leg.

The retaining member assembly, complete as shown in FIGURES 4 and 5, is fitted to a second panel 20 by pressing the legs 18 towards one another and inserting them through a square aperture 21 in the panel whereupon the resilience of the legs 18 causes them to spring apart and embrace the opposite edges of the aperture 21 in the outwardly facing channels of the legs. The curvature of the channels draws the base plate 13 towards the panel 20 until the spacers 17 butt against the back of the second panel 20 alongside the aperture 21. The hole 16 is then in alignment wtih the aperture 21 and the two panels 9 and 20 can be fixed together by pressing them together face to face so that the shank 7 of the stud passes through the aperture 21 and hole 16. Subsequent rotation of the stud from the front of the first panel through 90 degrees traps the straight portion 15 of the spring wire 12 over a dead centre position in the helical cam slot 8 in the stud of shank 7. 90 degree rotation in the opposition direction releases the fastener and allows the two panels to be separated again.

The second panel 20, shown in FIGURE 1, has a number of apertures 21 arranged at what is known as the "international fixings centres" and two of the retaining member assemblies are shown fitted to two of the apertures 21.

A retaining member assembly can subsequently be removed again from the panel 20 by pressing the outwardly convex portions of the legs 18 together so that the legs are stressed toward one another and can be withdrawn from the aperture 21.

Many modifications may be made to the described fastener, for example the spring wire 12 may be replaced by a spring cup with internal screw threads for engagement by a quick release part helical external screw threads on the stud shank 7. The invention is therefore to be defined only in the terms of the appended claims.

I claim:
1. A quick-release fastener part for application to a panel formed with an opening defined by opposed edge portions, said fastener part comprising in combination an apertured plate presenting inner and outer faces as well as a central and end zones, a spring rod extending across the inner face of said plate in line with its aperture, means for securing the rod ends to said plate one within each of its end zones, the opposite edge portions of each end zone of said plate extending outwardly therefrom to provide spacer elements to contact one of the surfaces of a panel to which said fastener part is applied and thus maintain the plate in spaced relationship with said panel, and resilient legs at the edges of the central zone of said plate also extending outwardly therefrom for a distance greater than that of said spacer elements such that the free ends of said legs may project through the opening of a panel and contact, by means provided at said free ends, the other of the surfaces of the panel at the edge zones of its opening to retain said plate in association with the panel.

2. A fastener part as defined in claim 1, said retaining means comprises concave parts at the free ends of said legs to receive portions of the panel adjacent the edges of its opennig to retain said fastener part against detachment therefrom.

3. A fastener part as defined in claim 1 in which apertures are formed thru said legs to increase the resiliency thereof.

References Cited
UNITED STATES PATENTS

| | | | |
|---|---|---|---|
| 2,372,496 | 3/1945 | Huelster | 24—221 |
| 2,506,953 | 5/1950 | Dzus | 24—221 |
| 2,560,519 | 7/1951 | Bedford | 24—221 |
| 2,695,046 | 11/1954 | Tinnerman | 151—41.75 |

BOBBY R. GAY, *Primary Examiner.*

E. SIMONSEN, *Assistant Examiner.*